United States Patent
Koike et al.

(10) Patent No.: US 8,328,341 B2
(45) Date of Patent: Dec. 11, 2012

(54) INK JET RECORDING INK, INK JET IMAGE-FORMING METHOD AND INK JET RECORDING APPARATUS

(75) Inventors: Shoji Koike, Yokohama (JP); Ryota Kato, Yokohama (JP); Hitoshi Yoshino, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 12/600,893

(22) PCT Filed: Jul. 22, 2008

(86) PCT No.: PCT/JP2008/063483
§ 371 (c)(1), (2), (4) Date: Nov. 19, 2009

(87) PCT Pub. No.: WO2009/014242
PCT Pub. Date: Jan. 29, 2009

(65) Prior Publication Data
US 2010/0165019 A1    Jul. 1, 2010

(30) Foreign Application Priority Data

Jul. 23, 2007  (JP) ................. 2007-191038
Feb. 18, 2008  (JP) ................. 2008-036153

(51) Int. Cl.
*G01D 11/00* (2006.01)
(52) U.S. Cl. ............ 347/100; 347/95; 523/160
(58) Field of Classification Search ........... 347/95–105; 106/31.27, 31.6, 31.13; 523/160, 161
See application file for complete search history.

(56) References Cited

U.S. PATENT DOCUMENTS 4,557,761 A   12/1985   Kobayashi et al.
(Continued)

FOREIGN PATENT DOCUMENTS

JP    2000-198957    7/2000
(Continued)

OTHER PUBLICATIONS

Feb. 4, 2010 International Preliminary Report on Patentability and Oct. 28, 2008 Written Opinion in International Patent Application No. PCT/JP2008/063483.

(Continued)

*Primary Examiner* — Manish S Shah
(74) *Attorney, Agent, or Firm* — Fitzpatrick, Cella, Harper & Scinto

(57) ABSTRACT

The invention provides an ink jet recording ink containing a self-dispersion pigment, to the surface of which an anionic functional group represented by the following general formula (I) has been bonded directly or through another atomic group, water, a water-soluble substance having a coefficient of hydrophilicity-hydrophobicity of 0.37 or more as defined by the following equation (A) and a water-soluble substance having a coefficient of hydrophilicity-hydrophobicity of 0.25 or less as defined by the equation (A), and having a surface tension of 34 mN/m or less.

General formula (I)

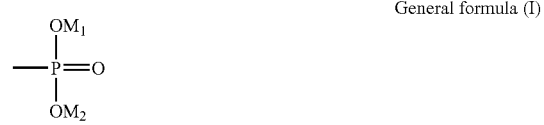

wherein $M_1$ and $M_2$ are, independently of each other, a hydrogen atom, alkali metal, ammonium or organic ammonium;

Coefficient of hydrophilicity-hydrophobicity=[(Water activity value of a 20% aqueous solution)−(Molar fraction of water in the 20% aqueous solution)]/[1−(Molar fraction of water in the 20% aqueous solution)]   Equation (A)

13 Claims, 2 Drawing Sheets

U.S. PATENT DOCUMENTS

| | | | |
|---|---|---|---|
| 4,632,703 A | 12/1986 | Koike et al. | |
| 4,661,158 A | 4/1987 | Kobayashi et al. | |
| 4,689,078 A | 8/1987 | Koike et al. | |
| 4,702,742 A | 10/1987 | Iwata et al. | |
| 4,723,129 A | 2/1988 | Endo et al. | |
| 4,725,849 A | 2/1988 | Koike et al. | |
| 4,740,796 A | 4/1988 | Endo et al. | |
| 4,849,770 A | 7/1989 | Koike et al. | |
| 4,853,036 A | 8/1989 | Koike et al. | |
| 4,923,515 A | 5/1990 | Koike et al. | |
| 4,957,553 A | 9/1990 | Koike et al. | |
| 4,965,609 A | 10/1990 | Tomida et al. | |
| 4,965,612 A | 10/1990 | Sakaki et al. | |
| 4,969,951 A | 11/1990 | Koike et al. | |
| 4,973,499 A | 11/1990 | Iwata et al. | |
| 4,986,850 A | 1/1991 | Iwata et al. | |
| 5,017,227 A | 5/1991 | Koike et al. | |
| 5,053,078 A | 10/1991 | Koike et al. | |
| 5,067,980 A | 11/1991 | Koike et al. | |
| 5,075,699 A | 12/1991 | Koike et al. | |
| 5,099,255 A | 3/1992 | Koike et al. | |
| 5,101,217 A | 3/1992 | Iwata et al. | |
| 5,118,351 A | 6/1992 | Shirota et al. | |
| 5,124,718 A | 6/1992 | Koike et al. | |
| 5,141,558 A | 8/1992 | Shirota et al. | |
| 5,151,128 A | 9/1992 | Fukushima et al. | |
| 5,190,581 A | 3/1993 | Fukushima et al. | |
| 5,220,347 A | 6/1993 | Fukushima et al. | |
| 5,221,333 A | 6/1993 | Shirota et al. | |
| 5,248,991 A | 9/1993 | Shirota et al. | |
| 5,250,121 A | 10/1993 | Yamamoto et al. | |
| 5,254,157 A | 10/1993 | Koike et al. | |
| 5,257,036 A | 10/1993 | Koike et al. | |
| 5,258,066 A | 11/1993 | Kobayashi et al. | |
| 5,296,022 A | 3/1994 | Kobayashi et al. | |
| 5,329,305 A | 7/1994 | Fukushima et al. | |
| 5,358,558 A | 10/1994 | Yamamoto et al. | |
| 5,380,358 A | 1/1995 | Aoki et al. | |
| 5,396,275 A | 3/1995 | Koike et al. | |
| 5,468,553 A | 11/1995 | Koike et al. | |
| 5,494,733 A | 2/1996 | Koike et al. | |
| 5,500,023 A | 3/1996 | Koike et al. | |
| 5,515,093 A | 5/1996 | Haruta et al. | |
| 5,540,764 A | 7/1996 | Haruta et al. | |
| 5,594,485 A | 1/1997 | Koike et al. | |
| 5,635,291 A | 6/1997 | Yoshino et al. | |
| 5,645,631 A | 7/1997 | Koike et al. | |
| 5,658,376 A | 8/1997 | Noguchi et al. | |
| 5,679,451 A | 10/1997 | Kondo et al. | |
| 5,686,951 A | 11/1997 | Koike et al. | |
| 5,698,478 A | 12/1997 | Yamamoto et al. | |
| 5,707,716 A | 1/1998 | Yoshino et al. | |
| 5,718,793 A | 2/1998 | Inamoto et al. | |
| 5,738,932 A | 4/1998 | Kondo et al. | |
| 5,764,261 A | 6/1998 | Koike et al. | |
| 5,781,216 A | 7/1998 | Haruta et al. | |
| 5,782,967 A | 7/1998 | Shirota et al. | |
| 5,800,916 A | 9/1998 | Yoshino et al. | |
| 5,804,320 A | 9/1998 | Tomioka et al. | |
| 5,846,647 A | 12/1998 | Yoshino et al. | |
| 5,851,654 A | 12/1998 | Yoshino et al. | |
| 5,869,177 A | 2/1999 | Yoshino et al. | |
| 5,902,387 A | 5/1999 | Suzuki et al. | |
| 5,922,625 A | 7/1999 | Haruta et al. | |
| 5,955,142 A | 9/1999 | Yoshino et al. | |
| 5,955,185 A | 9/1999 | Yoshino et al. | |
| 5,962,124 A | 10/1999 | Yoshino et al. | |
| 6,000,794 A | 12/1999 | Kondo et al. | |
| 6,033,066 A | 3/2000 | Koike et al. | |
| 6,036,307 A | 3/2000 | Hakamada et al. | |
| 6,139,939 A | 10/2000 | Haruta et al. | |
| 6,177,188 B1 | 1/2001 | Ichioka et al. | |
| 6,214,963 B1 | 4/2001 | Noguchi et al. | |
| 6,342,289 B1 | 1/2002 | Eguchi et al. | |
| 6,375,317 B1 | 4/2002 | Osumi et al. | 347/100 |
| 6,391,440 B1 | 5/2002 | Yoshino et al. | |
| 6,394,597 B1 | 5/2002 | Koike et al. | |
| 6,398,355 B1 | 6/2002 | Shirota et al. | |
| 6,426,766 B1 | 7/2002 | Shirota et al. | |
| 6,474,803 B1 | 11/2002 | Shirota et al. | |
| 6,552,156 B2 | 4/2003 | Noguchi et al. | |
| 6,576,324 B2 | 6/2003 | Yoshino et al. | |
| 6,613,821 B2 | 9/2003 | Suzuki et al. | |
| 6,619,791 B2 | 9/2003 | Tochihara et al. | |
| 6,649,661 B2 | 11/2003 | Yoshino et al. | |
| 6,676,254 B2 | 1/2004 | Nagashima et al. | |
| 6,698,876 B2 | 3/2004 | Sato et al. | |
| 6,706,340 B2 | 3/2004 | Yoshino et al. | |
| 6,716,495 B1 | 4/2004 | Yoshino et al. | |
| 6,720,041 B2 | 4/2004 | Yoshino et al. | |
| 6,723,137 B1 | 4/2004 | Hakamada et al. | |
| 6,874,881 B2 | 4/2005 | Suzuki et al. | |
| 6,945,646 B2 | 9/2005 | Ogino et al. | |
| 6,964,700 B2 * | 11/2005 | Uji et al. | 347/100 |
| 7,029,109 B2 | 4/2006 | Shirota et al. | |
| 7,055,943 B2 | 6/2006 | Suzuki et al. | |
| 7,141,105 B2 | 11/2006 | Udagawa et al. | |
| 7,144,449 B2 | 12/2006 | Udagawa et al. | |
| 7,144,613 B2 | 12/2006 | Eguchi et al. | |
| 7,185,978 B2 | 3/2007 | Nagashima et al. | |
| 7,306,664 B2 | 12/2007 | Kato et al. | |
| 7,416,639 B2 | 8/2008 | Yoshino et al. | |
| 7,429,291 B2 | 9/2008 | Udagawa et al. | |
| 7,449,056 B2 | 11/2008 | Kato et al. | |
| 7,464,965 B2 | 12/2008 | Udagawa et al. | |
| 7,611,570 B2 | 11/2009 | Koike et al. | |
| 7,641,723 B2 | 1/2010 | Koike et al. | |
| 2005/0204957 A1 * | 9/2005 | Momose et al. | 347/100 |
| 2006/0000386 A1 * | 1/2006 | Hakamada et al. | 106/31.13 |
| 2006/0078697 A1 | 4/2006 | Yoshino | |
| 2006/0169171 A1 * | 8/2006 | Lee et al. | 106/31.6 |
| 2007/0013761 A1 | 1/2007 | Yoshino et al. | |
| 2008/0260948 A1 | 10/2008 | Katsuragi et al. | |
| 2009/0078889 A1 | 3/2009 | Udagawa et al. | |

FOREIGN PATENT DOCUMENTS

| | | |
|---|---|---|
| JP | 2003-301129 | 10/2003 |
| JP | 2004-195706 | 7/2004 |
| JP | 2004-209762 | 7/2004 |
| JP | 2004209762 A * | 7/2004 |
| JP | 2006-274023 | 10/2006 |

OTHER PUBLICATIONS

Oct. 28, 2008 International Search Report and Written Opinion in International Patent Appln. No. PCT/JP2008/063483.

* cited by examiner

INK JET RECORDING INK, INK JET IMAGE-FORMING METHOD AND INK JET RECORDING APPARATUS

TECHNICAL FIELD

The present invention relates to an ink jet recording ink, an ink jet image-forming method and an ink jet recording apparatus, in which images are formed on plain paper.

BACKGROUND ART

With the spread of an ink jet recording system, there is a demand for speeding up of recording and improvement in the quality of recorded images such as images of characters and photographs when recording is conducted on plain paper by ink jet recording.

For example, there is a demand for recording office documents, photographic images of digital cameras and various kinds of information put on internet websites on plain paper at high speed and on both sides of the plain paper. There is also a demand for achieving such clear image quality as in recorded images obtained with a laser beam printer. There is further a demand for obtaining a high image density when character images are printed and providing sharp character images that are inhibited from being defaced even when the character images are small.

In recorded images such as color photographs and tables, there is also a demand for inhibiting bleeding at a color boundary portion, which is caused upon contact of a plurality of recording inks of different colors with each other.

In order to meet such demands, there has been proposed an ink, which contains organic ultrafine particles having an average particle size of 0.5 μm or less and having been internally and three-dimensionally crosslinked and provides high-density images inhibited from bleeding on plain paper (see Japanese Patent Application Laid-Open No. 2004-195706). There has also been proposed an ink that contains a permeability-imparting agent wherein the content of the permeability-imparting agent is made larger than the content in which the surface tension of the ink composition, which decreases according to the increase in the amount of the agent, ceases to decrease (see Japanese Patent Application Laid-Open No. 2003-301129).

DISCLOSURE OF THE INVENTION

The present invention relates to an ink jet recording ink, an ink jet image-forming method and an ink jet recording apparatus, which are suitable for use in forming a recorded image on plain paper. Problems sought for achievement are shown below.
1) An ink is fixed at high speed.
2) A recorded image has a high density and is clear.
3) A recorded image is inhibited from causing bleeding between inks.
4) A recorded image is inhibited from causing strike through.
5) Even when small characters are printed, the printed characters are sharp and inhibited from being defaced.
6) A recorded image has good water fastness and fixability.
7) Ejection properties such as inhibited clogging are good.

According to inks described in Japanese Patent Application Laid-Open Nos. 2004-195706 and 2003-301129, water fastness and inhibition of bleeding between two (2) color inks are improved to some extent. However, with these inks, all the above seven problems are not satisfied, and in particular, problems of making the density of recorded image higher, inhibiting the strike through of the recorded image, and achieving good printing of small characters are left unsolved.

As described above, an ink jet image-forming method capable of sufficiently satisfying all the above seven problems, which have been demands for achieving high-quality recording on plain paper in recent years, at the same time is not found.

Accordingly, it is an object of the present invention to provide an ink jet recording ink, an ink jet image-forming method and an ink jet recording apparatus, which sufficiently satisfy the above problems 1) to 7) at the same time.

The above object can be achieved by the present invention described below. More specifically, according to a first invention, the present invention provides an ink jet recording ink comprising a self-dispersion pigment, to the surface of which an anionic functional group represented by the following general formula (I) has been bonded directly or through another atomic group, water, a water-soluble substance having a coefficient of hydrophilicity-hydrophobicity of 0.37 or more as defined by the following equation (A) and a water-soluble substance having a coefficient of hydrophilicity-hydrophobicity of 0.25 or less as defined by the equation (A), and having a surface tension of 34 mN/m or less.

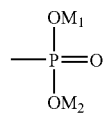

General formula (I)

wherein $M_1$ and $M_2$ are, independently of each other, a hydrogen atom, alkali metal, ammonium or organic ammonium;

Coefficient of hydrophilicity-hydrophobicity=[(Water activity value of a 20% aqueous solution)−(Molar fraction of water in the 20% aqueous solution)]/[1−(Molar fraction of water in the 20% aqueous solution)]   Equation (A)

According to a second invention, the present invention provides an ink jet image-forming method for forming an image by applying the above-described ink in a fixed amount of from 0.5 pl or more to 6.0 pl or less to plain paper, wherein the application of the ink is divided into plural times when an image having a portion where the ink is applied in a duty of 80% or more and in an amount of 5.0 μl/cm² or less in total is formed in a basic matrix for forming the image, and the amount of the ink applied at each of the times divided is 0.7 μl/cm² or less.

According to a third invention, the present invention provides an ink jet recording apparatus equipped with a recording head for forming an image by applying the above-described ink in a fixed amount of from 0.5 pl or more to 6.0 pl or less to plain paper, wherein the apparatus comprises a control mechanism, by which the application of the ink is divided into plural times when an image having a portion where the ink is applied in a duty of 80% or more and in an amount of 5.0 μl/cm² or less in total is formed in a basic matrix for forming the image, and the amount of the ink applied at each of the times divided is controlled to 0.7 μl/cm² or less.

According to the ink jet recording ink, ink jet image-forming method and ink jet recording apparatus of the present invention, the clogging with an ink can be inhibited, and the fixing of the ink can be conducted at high speed when the ink is applied to plain paper. It is also possible to provide a clear and high-quality image having sufficient water fastness and image density and inhibited from bleeding. Even when small characters are printed, the resulting characters are sharp and can be inhibited from being defaced. It is further possible to form an image inhibited from causing strike through and suitable for double sided printing. These are marked effects that are exhibited for the first time by meeting all the above-described constitutional requirements of the present invention and unanticipatable from the prior art.

Further features of the present invention will become apparent from the following description of exemplary embodiments with reference to the attached drawings.

BEST MODE FOR CARRYING OUT THE INVENTION

Figure 1:
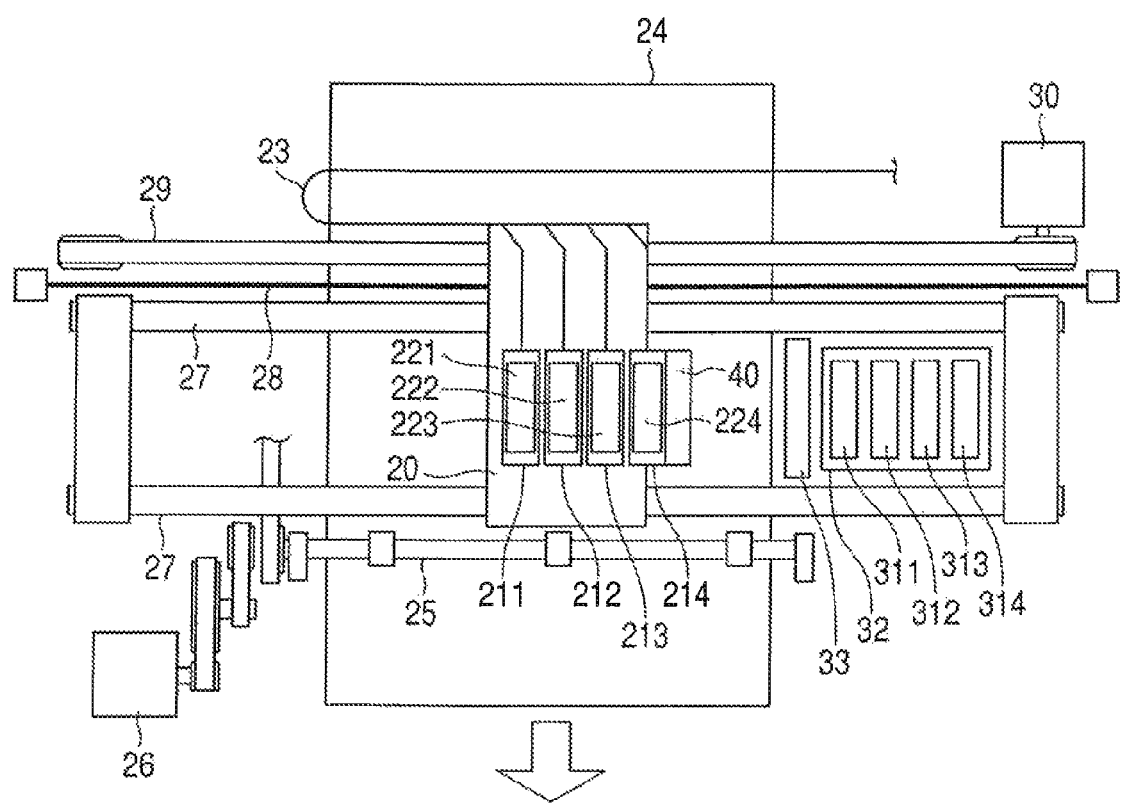
FIG. 1 schematically illustrates an ink jet recording apparatus according to an embodiment applicable to the present invention.

The present inventors have carried out an investigation on an ink jet recording ink, and ink jet recording method and apparatus that provide clear and high-quality images fixed at high speed to plain paper and having sufficient water fastness and image density, and are suitable for double side printing. As a result, it has been found that the composition of an ink that quickly causes solid-liquid separation between a pigment and an aqueous medium after impacted on the plain paper, physical properties of the ink, the amount of the ink to be applied, which is controlled on the side of a recording apparatus, and conditions for divided application of the ink are precisely controlled, whereby the above object can be achieved.

The present invention will hereinafter be described in more detail by preferred embodiments.
<Ink>
(Coloring Material)

Coloring materials used in inks used in the present invention are self-dispersion pigments, to the surfaces of which an anionic functional group represented by the following general formula (I) has been bonded directly or through another atomic group.

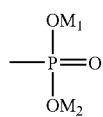

General formula (I)

In the hydrophilic group of the formula (I), "$M_1$" and "$M_2$" are, independently of each other, a hydrogen atom, alkali metal, ammonium or organic ammonium. Specific examples of the alkali metal include Li, Na, K, Rb and Cs. Specific examples of the organic ammonium include methylammonium, dimethylammonium, trimethylammonium, ethylammonium, diethylammonium, triethylammonium, monohydroxymethyl(ethyl)amine, dihydroxymethyl(ethyl)amine and trihydroxymethyl(ethyl)amine.

Specific examples of another atomic group interposed include linear or branched and substituted or unsubstituted alkylene groups having 1 to 12 carbon atoms, a substituted or unsubstituted phenylene group, and a substituted or unsubstituted naphthylene group. Examples of substituents on the alkylene, phenylene and naphthylene groups include a hydroxyl group, an amino group and linear or branched alkyl groups having 1 to 6 carbon atoms.

When a general water-soluble dye is used as a coloring material, an image formed on a recording medium, to the surface of which cellulose fiber is exposed, such as plain paper is poor in water fastness. When the self-dispersion pigment having the group represented by the general formula (I) is used, however, the resulting image can have good water fastness. When compared with a pigment of a resin-dispersion system (a system using a resin as a dispersant in combination) that is another dispersion form of a water-dispersible pigment, the self-dispersion pigment is considerably advantageous in color developing because the fixing of a coloring matter component composed of the pigment to a surface portion of paper is efficient by a degree that no dispersant is contained.

In the self-dispersion pigment according to the present invention, solid-liquid separation after the ink is impacted on paper is smoothly advanced by a synergistic effect with the water-soluble substances used in combination, and so excellent results can be achieved in color developing.

As the self-dispersion pigments, pigments having another functional group, for example, a surface modification group composed only of a sulfonic acid (or a salt thereof) or a carboxylic acid (or a salt thereof) have been known. When these conventional general self-dispersion pigments are compared with the self-dispersion pigment used in the present invention, the self-dispersion pigment used in the present invention is strong in power for hiding a size scattering in the surface of plain paper, and so an outstanding effect is observed in prevention of the so-called blank area phenomenon at a solid print portion.

As described above, the self-dispersion pigment in the present invention is a pigment, which is obtained by imparting self-dispersibility to the pigment by a treatment for introducing a group represented by the general formula (I) into the surface of the pigment directly or through another atomic group, and does basically not essentially require a dispersant. Here, the amount of the group represented by the general formula (I) introduced into the pigment particles is preferably 100 to 5,000 µmol/g, more preferably 300 to 2,500 µmol/g. If the amount is less than 100 µmol/g, the pigment treated is not stably dispersed in an aqueous solution, and the pigment precipitates, and so an ink containing such a pigment may lack reliability as the ink in some cases.

As a pigment used in a black ink, carbon black is preferably used. Examples of carbon black include carbon black pigments such as furnace black, lamp black, acetylene black and channel black. Such a carbon black pigment preferably has the following characteristics: the primary particle size is from 15 nm or more to 40 nm or less; the specific surface area is from 50 m²/g or more to 400 m²/g or less as determined according to the BET method; the DBP oil absorption is from 40 ml/100 g or more to 200 ml/100 g or less; and the volatile matter content is 0.5% by weight or more to 10% by weight of less.

As pigments used in color inks, organic pigments are preferably used. As specific examples thereof, may be mentioned the following pigments: insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; thioindigo pigments; condensed azo pigments; diketopyrrolopyrrole pigments; and other pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

When organic pigments are numerated by COLOR INDEX (C.I.) numbers, the following pigments may be exemplified. C.I. Pigment Yellow: 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180 and 185; C.I. Pigment Orange: 16, 36, 43, 51, 55, 59, 61 and 71; C.I. Pigment Red: 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255 and 272; C.I. Pigment Violet: 19, 23, 29, 30, 37, 40 and 50; C.I. Pigment Blue: 15, 15:1, 15:3, 15:4, 15:6, 22, 60 and 64; C.I. Pigment Green: 7 and 36; and C.I. Pigment Brown 23, and 26. Among these pigments, the following pigments are more preferable. C.I. Pigment Yellow: 13, 17, 55, 74, 93, 97, 98, 110, 128, 139, 147, 150, 151, 154, 155, 180 and 185 as yellow pigments; C.I. Pigment Red: 122, 202 and 209, and C.I. Pigment Violet 19 as magenta pigments; and C.I. Pigment Blue: 15:3 and 15:4 as cyan pigments. Quite naturally, other pigments than the above-mentioned pigments may also be used.

The average particle size of the self-dispersion pigment used in the present invention is preferably 60 nm or more, more preferably 70 nm or more, still more preferably 75 nm or more. Also, the average particle size is preferably 145 nm or less, more preferably 140 nm or less, still more preferably 130 nm or less. As a method for measuring the average particle size, the average particle size can be measured by means of FPAR-1000 (manufactured by Otsuka Electronics Co., Ltd.) or Nanotrac UPA 150EX (manufactured by NIKKISO) utilizing scattering of laser beam. (In the case of Nanotrac UPA, the particle size is measured as a 50% cumulative value).

Two or more pigments may be used in combination in the same ink as needed.

The amount of the above-described self-dispersion pigment added into an ink is preferably 0.5% by weight or more, more preferably 1% by weight or more, still more preferably 2% by weight or more based on the total weight of the ink. Further, the amount is preferably 15% by weight or less, more preferably 10% by weight or less, still more preferably 8% by weight or less.

(Aqueous Medium)

The ink according to the present invention contains water as an essential component, and the content of water in the ink is preferably 30% by mass or more based on the total mass of the ink. Further, the content is preferably 95% by mass or less. In addition to water, two kinds of water-soluble compounds that are essential components are used in combination to provide an aqueous medium. The water-soluble compounds are miscible with water without undergoing phase separation from water in the form of a 20% by mass liquid mixed with water and are high in hydrophilicity. Any water-soluble compound easy to evaporate is not preferable from the viewpoints of solid-liquid separation and the prevention of clogging, and a water-soluble compound having a vapor pressure of 0.04 mmHg or less at 20° C. is preferable.

The ink according to the present invention contains, as essential components, a water-soluble compound having a coefficient of hydrophilicity-hydrophobicity of 0.37 or more as defined by the following equation (A) and a water-soluble compound having a coefficient of hydrophilicity-hydrophobicity of 0.25 or less as defined by the following equation (A).

Coefficient of hydrophilicity-hydrophobicity=[(Water activity value of a 20% aqueous solution)−(Molar fraction of water in the 20% aqueous solution)]/[1−(Molar fraction of water in the 20% aqueous solution)]     Equation (A)

The water activity value in the equation is represented by the expression:

Water activity value=(Water vapor pressure of the aqueous solution)/(Water vapor pressure of pure water).

Various methods are available as methods for measuring the water activity value. Although the method is not limited to any method, a chilled mirror dew point measuring method among others is suitable for use in measurement of materials used in the present invention. Values given in the present description are obtained by subjecting a 20% aqueous solution of each water-soluble compound to the measurement at 25° C. by means of Aqua Lab CX-3TE (manufactured by DECAGON Co.) according to this measuring method.

According to the Raoult's Law, a rate of vapor pressure depression of a dilute solution is equal to a molar fraction of a solute and has no connection with the kinds of the solvent and the solute, so that the molar fraction of water in an aqueous solution is equal to the water activity value. However, when water activity values of aqueous solutions of various water-soluble compounds are measured, the water activity values do not often consist with the molar fraction of water.

When the water activity value of an aqueous solution is lower than the molar fraction of water, the water vapor pressure of the aqueous solution comes to be smaller than a theoretical calculated value, and evaporation of water is inhibited by the presence of a solute. From this fact, it is found that the solute is a substance great in hydration force. When the water activity value of an aqueous solution is higher than the molar fraction of water to the contrary, the solute is considered to be a substance small in hydration force.

The present inventors have paid attention to the fact that the degree of hydrophilicity or hydrophobicity of a water-soluble compound contained in an ink greatly affects the propelling of solid-liquid separation between a self-dispersion pigment and an aqueous medium and various ink performances. From this fact, the coefficient of hydrophilicity-hydrophobicity represented by the equation (A) has been defined. The water activity value is measured on aqueous solutions of various water-soluble compounds at a fixed concentration of 20% by mass. The degree of hydrophilicity or hydrophobicity between various solutes can be relatively compared by being converted to the equation (A) even when the molecular weights of the solutes and the molar fractions of water are different. Since the water activity value of an aqueous solution does not exceed one (1), the maximum value of the coefficient of hydrophilicity-hydrophobicity is one (1).

The coefficients of hydrophilicity-hydrophobicity of water-soluble compounds used in ink-jet inks, which are obtained according to the equation (A), are shown in Table 1. However, the water-soluble compounds according to the present invention are not limited only to these compounds.

TABLE 1

| Substance name | Coefficient of hydrophilicity-hydrophobicity |
|---|---|
| 1,2-Hexanediol | 0.97 |
| 1,2-Pentanediol | 0.93 |
| 3-Methyl-1,3-butanediol | 0.90 |
| 1,2-Butanediol | 0.90 |
| 2,4-Pentanediol | 0.88 |
| 1,6-Hexanediol | 0.76 |
| 1,7-Heptanediol | 0.73 |
| 3-Methyl-1,5-pentanediol | 0.54 |
| 1,5-Pentanediol | 0.41 |
| Trimethylolpropane | 0.31 |
| Ethyleneurea | 0.30 |
| 1,2,6-Hexanetriol | 0.28 |
| 1,2,3-Butanetriol | 0.22 |
| Sorbitol | 0.21 |
| Urea | 0.20 |
| Diethylene glycol | 0.15 |
| 1,2,4-Butanetriol | 0.15 |
| Glycerol | 0.11 |
| Diglycerol | 0.08 |
| Triethylene glycol | 0.07 |
| Polyethylene glycol 200 | −0.09 |
| Polyethylene glycol 600 | −0.43 |

Water-soluble compounds having the intended coefficient of hydrophilicity-hydrophobicity can be selected for use from among various kinds of water-soluble compounds having suitability for ink jet recording inks.

The present inventors have carried out an investigation as to the relationship between water-soluble compounds different in coefficient of hydrophilicity-hydrophobicity and the performance of various inks when the water-soluble compounds are contained in the inks. As a result, the following findings have been obtained.

Printing characteristics of small characters, such as bleeding between two (2) colors and dot gain were extremely improved when a water-soluble compound high in hydrophobic tendency, which has a coefficient of hydrophilicity-hydrophobicity of 0.37 or more, is used. Among others, compounds having a glycol structure of a hydrocarbon having 4 to 7 carbon atoms were particularly preferable. It is considered that these water-soluble compounds are relatively small in affinity for water, self-dispersion pigment and cellulose fiber after an ink is impacted on paper, and so the compounds have the role of strongly propelling solid-liquid separation between the self-dispersion pigment and the aqueous medium. Among these compounds, 1,2-hexanediol and 1,6-hexanediol are particularly preferable.

On the other hand, it is important from the viewpoint of prevention of clogging in an orifice that solidification of an ink due to evaporation of water is hard to occur. The present inventors have found that the clogging with the ink in the orifice is prevented by using a water-soluble compound having hydration force of a certain extent or more in combination. When a water-soluble compound having a coefficient of hydrophilicity-hydrophobicity of 0.25 or less is used in combination with the water-soluble compound having a coefficient of hydrophilicity-hydrophobicity of 0.37 or more, these compounds can synergistically act to inhibit bleeding and dot gain in the resulting image and further prevent clogging with the ink in the orifice. Among others, glycerol, diglycerol and polyethylene glycol having a number average molecular weight of 200 or more are preferable.

The total content of the water-soluble compound (A) having a coefficient of hydrophilicity-hydrophobicity of 0.37 or more and the water-soluble compound (B) having a coefficient of hydrophilicity-hydrophobicity of 0.25 or less in the ink is preferably 5% by mass or more, more preferably 6% by mass or more, still more preferably 7% by mass or more. Also, the total content is preferably 40% by mass or less, more preferably 35% by mass or less, still more preferably 30% by mass or less. A proportion "(A)/(B)" of the content of the water-soluble compound (A) to the content of the water-soluble compound (B) in the ink is preferably 1/20 or more, more preferably 1/10 or more, still more preferably 1/5 or more. Also, the proportion is preferably 20/1 or less, more preferably 10/1 or less, still more preferably 5/1 or less.

The ink used in the present invention preferably contains a water-soluble compound having a coefficient of hydrophilicity-hydrophobicity of 0.26 or more, but less than 0.37 in addition to these water-soluble compounds. By such composition, the water-soluble compound having a coefficient of hydrophilicity-hydrophobicity of 0.26 or more, but less than 0.37, the water-soluble compound having a coefficient of hydrophilicity-hydrophobicity of 0.37 or more and the water-soluble compound having a coefficient of hydrophilicity-hydrophobicity of 0.25 or less synergistically act to well inhibit bleeding and dot gain. In addition, the clogging with the ink can be better prevented. The content of the water-soluble compound having a coefficient of hydrophilicity-hydrophobicity of 0.26 or more, but less than 0.37 in the ink is preferably 1% by mass or more, more preferably 2% by mass or more, still more preferably 3% by mass or more. Furthermore, the content is preferably 30% by mass or less, more preferably 25% by mass or less, still more preferably 20% by mass or less. As the water-soluble compound having a coefficient of hydrophilicity-hydrophobicity of 0.26 or more, but less than 0.37, trimethylolpropane is particularly preferable.

(Surfactant)

The ink used in the present invention preferably contains a surfactant for achieving ejection stability with good balance. In particular, the ink preferably contains a nonionic surfactant. Among nonionic surfactants, polyoxyethylene alkyl ethers and ethylene oxide adducts of acetylene glycol are particularly preferable. The HLB (hydrophile-lipophile balance) values of these nonionic surfactants are 10 or more. The content of the surfactant used in the ink in combination is preferably 0.1% by mass or more, more preferably 0.2% by mass or more, still more preferably 0.3% by mass or more. The content is preferably 5% by mass or less, more preferably 4% by mass or less, still more preferably 3% by mass or less.

(Other Additives)

Besides the above components, for example, a viscosity modifier, an antifoaming agent, a preservative, a mildewproofing agent, an antioxidant and a penetrant may be added as additives to the ink according to the present invention, as needed, to provide the ink as an ink having desired physical property values.

(Surface Tension)

The surface tension of the ink used in the present invention is 34 mN/m or less. The surface tension of the ink is preferably 32 mN/m or less, more preferably 30 mN/m or less.

Since glossy paper and mat paper that are exclusive paper for ink jet have a porous ink-receptive layer formed on the surface of paper unlike plain paper, such paper is scarcely affected by the surface tension of an ink to rapidly advance permeation of the ink.

However, a sizing agent having a water-repellent effect is internally and/or externally added to plain paper, so that the permeation of an ink is often inhibited. In other words, the plain paper is lower in critical surface tension, which is an index to whether the surface can be rapidly wetted with the ink or not, than the exclusive paper for ink jet.

When the surface tension of the ink is higher than 34 mN/m, the surface tension comes to be higher than the critical surface tension of the plain paper, so that the plain paper is not immediately wetted even when the ink impacts the paper, and permeation of the ink is not rapidly started. When the surface tension of the ink is high, such an ink is hard to be fixed at high speed even when wettability with paper is somewhat improved to lower a contact angle between the ink and the paper. Further, such an ink has a tendency to deteriorate the fixability thereof. When the surface tension of the ink is 34 mN/m or less, pore absorption is mainly caused. When the surface tension of the ink is higher than 34 mN/m, fiber absorption is mainly caused. With respect to the absorption speed of an ink into paper by absorption of these two types, the pore absorption is overwhelmingly faster. Thus, an ink that mainly causes pore absorption is provided in the present invention, thereby realizing high-speed fixing.

The ink that mainly causes pore absorption is also advantageous in that bleeding is inhibited when recording is conducted by causing two inks of different colors to adjoin because the two inks are inhibited from remaining at the same time on the surface of paper. This ink is also advantageous in that a high image density is achieved.

On the other hand, the surface tension of the ink used in the present invention is preferably 20 mN/m or more from another viewpoint of operability of the ink. When the surface tension is 20 mN/m or more, a meniscus can be retained in an orifice, so that "ink falling" that the ink comes out of an ejection opening and escapes from an orifice can be inhibited.

<Recording Method>

In the recording method of the present invention, the amount of an ink applied at one time is controlled to a fixed amount of from 0.5 pl or more to 6.0 pl or less. The amount is preferably 1.0 pl or more, more preferably 1.5 pl or more. Further, the amount is preferably 5.0 pl or less, more preferably 4.5 pl or less. Any amount less than 0.5 pl is not preferable because the resulting image may become poor in fixability and water fastness in some cases. If the amount exceeds 6.0 pl, characters printed may be defaced by dot gain in some cases when small characters of the order of from 2 point (1 point≈0.35 mm) to 5 point are printed.

Since the volume of the ink ejected greatly affects the strike through of the ink, the volume is important even in respect of the application to double side printing.

Generally, pores having a size of from 0.1 µm to 100 µm centering around from 0.5 µm to 5.0 µm are distributed in plain paper. Incidentally, the plain paper referred to in connection with the present invention means copying paper used in a large amount in printers and copying machines, such as commercially available wood free paper, medium grade paper and PPC paper, or bond paper. The permeation phenomenon of an aqueous ink into the plain paper is largely divided into fiber absorption that the ink is directly absorbed and permeated into the cellulose fiber itself of the plain paper and pore absorption that the ink is absorbed and permeated into pores formed between cellulose fibers. The inks used in the present invention are inks to be mainly permeated by the pore absorption. Therefore, when the ink used in the present invention is applied to the plain paper and a part of the ink comes into contact with largish pores of about 10 µm or more, which are present on the surface of the plain paper, the ink is concentrated on the largish pores according to the Lucas-Washburn equation and absorbed and permeated therein. As a result, in this portion, the ink comes to particularly deeply be permeated, which is extremely disadvantageous in achieving high color development on the plain paper. On the other hand, as an ink becomes smaller in the size of ink droplet, the probability of an ink droplet coming into contact with the largish pore becomes lower, so that the ink is hard to be concentrated on and absorbed in the largish pore. Further, even if the ink droplet comes into contact with the largish pore, the amount of the ink deeply permeated may be small so far as the ink droplet is small. As a result, an image with high color development is obtained on the plain paper.

The upper critical value of 6.0 pl of the ink is a value empirically obtained by the present inventors. When 6.0 pl of the ink is assumed to be a sphere, the diameter thereof is about 23 µm when impacted on the plain paper. Taking the distribution condition of the largish pores of about 10 µm or more in the plain paper into consideration, it is considered that when the diameter of the ink is this diameter or less, the probability of contact between the largish pores and the ink upon impact becomes low, and so a preferable state without causing deep permeation of the ink is created.

The fixed amount of the ink, referred to in connection with the present invention means an ink ejected in a state that the structures of nozzles making up a recording head are not made different from among the nozzles, and the setting of changing drive energy applied is not made. In other words, in such a state, the amount of the ink applied is fixed even if ejection is somewhat varied because of an error in production of apparatus. With the amount of the ink applied made fixed, the permeation depth of the ink is stabilized, the image density of a recorded image becomes high, and image uniformity is improved. On the contrary, the amount of the ink is not fixed according to a system based on the premise that the amount of the ink applied is varied, so that variation in permeation depth of the ink becomes great because inks different in volume mixedly exist. In a high duty portion of a recorded image in particular, the image uniformity is deteriorated because a portion low in image density exists in the recorded image due to the variation in the permeation depth.

As a system suitable for applying an ink in a fixed amount, a thermal ink jet system that the ink is applied by the action of thermal energy is preferred from the viewpoint of ejection mechanism. More specifically, according to the thermal ink jet system, the variation in permeation depth of the ink is inhibited, and the resulting recorded image is high in image density and good in uniformity. In addition, the thermal ink jet system is suitable for achieving a recording head of a multi-nozzle and high-density type and also preferable for high-speed recording.

The problems of the present invention are then required in the case where an image having a portion with a duty of 80% or more is formed in a basic matrix for forming an image. A portion for calculating the duty is 50 µm×50 µm at the minimum. The image having a portion with a duty of 80% or more is an image having a portion formed with an ink applied to 80% or more of lattices among lattices in the matrix of the portion for calculating the duty. The size of lattices is determined by the resolution of the basic matrix. For example, when the resolution of the basic matrix is 1,200 dpi×1,200 dpi, the size of a lattice is $\frac{1}{1,200}$ inch×$\frac{1}{1,200}$ inch.

The image having the portion with a duty of 80% or more in the basic matrix is an image having a portion where one color ink is applied in a duty of 80% or more in the basic matrix. More specifically, in the case where four (4) color inks of black, cyan, magenta and yellow are used, the image is an image having a portion where at least one color ink thereof are applied in a duty of 80% or more in the basic matrix. On the other hand, an image having no portion with a duty of 80% or more in the basic matrix has a relatively small overlapping between inks impacted and may not cause problems of character defacement and bleeding in many cases even when the printing process is not devised.

The basic matrix of the present invention can be freely set according to the recording apparatus. The resolution of the basic matrix is preferably 600 dpi or more, more preferably 1,200 dpi or more. Also, the resolution is also preferably 4,800 dpi or less. The resolution may be the same or different in length and width so far as it falls within this range.

The problems of the present invention are also required in the case where an image having a portion wherein the total amount of an ink applied is 5.0 $\mu l/cm^2$ or less is formed in a basic matrix for forming an image. A portion for calculating the total amount of the ink applied is the same as the portion for calculating the duty. If an image having a portion that the total amount of the ink applied exceeds 5.0 $\mu l/cm^2$ is formed, in some cases, a clear image may not be obtained, or strike through may occur, which is disadvantageous for double side printing.

In the present invention, the application of the ink is divided into plural times when an image having a portion where the duty is 80% or more and the total amount of an ink applied is 5.0 $\mu l/cm^2$ or less is formed in the basic matrix for forming the image. The amount of the ink applied at each of the times divided is 0.7 $\mu l/cm^2$ or less, preferably 0.6 $\mu l/cm^2$ or less, more preferably 0.5 $\mu l/cm^2$ or less. If the amount of the ink applied to the image at each time exceeds 0.7 $\mu l/cm^2$, strike through, character defacement and/or bleeding may occur in some cases.

The reason why the application of the ink divided into the plural times in the formation of the image is an essential requirement in the present invention is based on the fact that there is a particular difference in performance between the case where the application is divided and the case where the application is not divided. The number of times of division of the ink application is at least 2 times or more. When the number of times of division is 3 times or more, the resulting recorded image becomes higher in density and good color developing. The number of times is preferably 8 times or less, more preferably 4 times or less. If the number of times of division exceeds 8 times, there is a tendency that the covering rate of the ink on the surface of plain paper is lowered to deteriorate color developing though such application is effective for inhibition of bleeding and good printing of small characters.

<Ink Jet Recording Apparatus>

The ink jet recording apparatus according to the present invention will hereinafter be described. An apparatus suitable for use in the present invention is an apparatus equipped with a recording head for applying an ink in a fixed amount of from 0.5 pl or more to 6 pl or less. The recording head of the ink jet recording apparatus according to the present invention is preferably a recording head that thermal energy is caused to act on an ink to apply the ink. Such a recording head is suitable for forming nozzles at a high density compared with a recording head that an ink is ejected by using a piezoelectric element. In addition, the recording head is excellent in applying the ink in the fixed amount and thus excellent in that variation in permeation depth of the ink is reduced, and the uniformity of the resulting recorded image is made good.

With respect to the typical construction and principle of the recording head that thermal energy is caused to act on an ink to apply the ink, those using the basic principle disclosed in, for example, U.S. Pat. Nos. 4,723,129 and 4,740,796 are preferable. This system may be applied to any of the so-called On-Demand type and continuous type. In particular, the On-Demand type is more advantageous because at least one driving signal, which corresponds to recording information and gives a rapid temperature rise exceeding nuclear boiling, is applied to an electrothermal converter arranged corresponding to a sheet or a liquid path, in which an ink is retained, thereby causing the electrothermal converter to generate thermal energy to cause film boiling on the heat-acting surface of a recording head, so that a bubble can be formed in the ink in response to the driving signal in relation of one to one. The ink is ejected through an ejection opening by the growth-contraction of this bubble to form at least one droplet. When the driving signal is applied in the form of a pulse, the growth-contraction of the bubble properly occurs in a moment, so that the amount of the ink ejected is fixed, and the ejection of the ink, which is also excellent in responsiveness, can be achieved. It is therefore preferable to use such pulsed signals.

FIG. 1 is a front elevation schematically illustrating an ink jet recording apparatus according to an embodiment of the present invention. A plurality of recording heads 211 to 214 of an ink jet system is mounted on a carriage 20. A plurality of ink ejection openings for ejecting an ink is arranged in each of the recording heads 211 to 214. The recording heads 211, 212, 213 and 214 are recording heads for ejecting cyan (C), magenta (M), yellow (Y) and black (K) inks, respectively.

Ink cartridges 221 to 224 are respectively constructed by the recording heads 211 to 214 and ink tanks for feeding inks to these recording heads.

A concentration sensor 40 is provided. The concentration sensor 40 is a reflection type concentration sensor and is so constructed that the density of a test pattern recorded on a recording medium can be detected in a state provided on a side surface of the carriage 20.

Control signals to the recording heads 211 to 214 are transferred through a flexible cable 23.

A recording medium 24, to the surface of which cellulose fiber is exposed, such as plain paper is held by discharge rollers 25 via conveyance rollers (not illustrated) and conveyed in a direction (secondary scanning direction) of an arrow by driving a conveyance motor 26.

The carriage 20 is guided and supported by a guide shaft 27 and a linear encoder 28. The carriage 20 is reciprocatingly moved in a main scanning direction along the guide shaft 27 through a drive belt 29 by driving a carriage motor 30.

A heating element (electricity-thermal energy converter) for generating thermal energy for ink ejection is provided in the interior (liquid path) of each of the ink ejection openings of the recording heads 211 to 214. The heating element is driven based on a recording signal according to reading timing of the linear encoder 28 to eject and apply ink droplets to the recording medium, thereby forming an image.

A recovery unit 32 having cap parts 311 to 314 is provided at a home position of the carriage 20 arranged outside a recording region. When recording is not conducted, the carriage 20 is moved to the home position, and the ink ejection opening faces of the recording heads 211 to 214 are closed by their corresponding caps 311 to 314, whereby sticking of the inks caused by evaporation of ink solvents or clogging by adhesion of foreign matter such as dust can be prevented. The capping function of the cap parts is utilized for solving ejection failure or clogging of ejection openings low in recording frequency. Specifically, the capping parts are utilized for blank ejection for preventing ejection failure, in which the inks are ejected to the cap parts located in a state separated from the ink ejection openings. Further, the cap parts are utilized for sucking the inks from the ink ejection openings in a capped state by a pump (not illustrated) to recover ejection of ejection openings undergone ejection failure.

An ink receiving part 33 plays the role of receiving ink droplets preliminarily ejected when the recording heads 211 to 214 pass through over it just before recording operation. A blade or wiping member (not illustrated) is arranged at a position adjoining the cap parts, whereby the ink ejection opening-forming faces of the recording heads 211 to 214 can be cleaned.

As described above, it is preferable to add the recovery unit for recording heads and preliminary units to the construction of the recording apparatus because the recording operation can be more stabilized. Specific examples of these units include capping units, cleaning units and pressurizing or sucking units for recording heads, and preliminary heating units by electrothermal converters, other heating elements than these converters or combinations thereof. It is also effective for stably conducting recording to provide a preliminary ejection mode that ejection separate from recording is conducted.

In addition, a cartridge type recording head, in which an ink tank is provided integrally with the recording head itself described in the above-described embodiment may also be used. Further, a replaceable chip type recording head, in which electrical connection to an apparatus body and the feed of an ink from the apparatus body become feasible by installing it in the apparatus body, may also be used.

Figure 2:
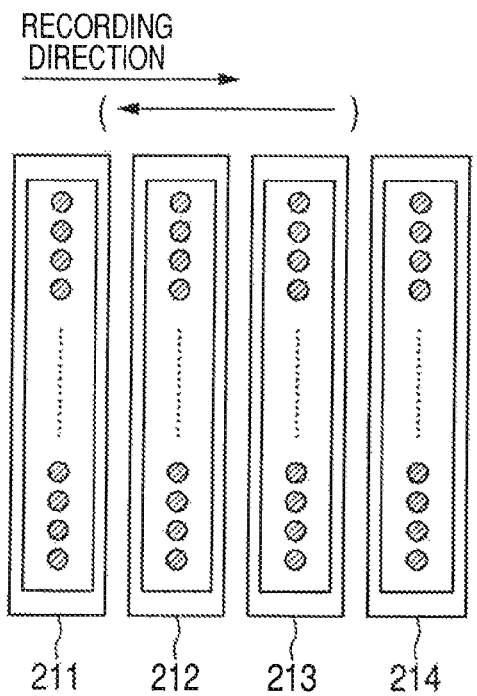
FIG. 2 illustrates recording heads applicable to an embodiment of the present invention.

FIG. 2 illustrates the construction of the recording heads 211 to 214. In the drawing, the recording scan directions of the recording heads 211 to 214 are directions indicated by arrows. A plurality of nozzles, i.e., ejection openings, arranged in a direction substantially perpendicular to the recording scan direction is provided in each of the recording heads 211 to 214. Each recording head ejects ink droplets at predetermined timing from the respective ejection openings while being moved and scanned in a recording scan direction in the drawing, whereby an image is formed on a recording medium with a recording resolution according to the arrangement density of the nozzles. At this time, the recording head may conduct recording operation in any direction of the recording scan directions. The recording operation may be conducted in any direction of forward and return directions.

The above-described embodiment is a recording apparatus of the serial type that a recording head is scanned to conduct recording. However, a recording apparatus of the full-line type that a recording head having a length corresponding to the width of a recording medium is used may also be used. As a recording head of the full-line type, there is construction that such recording heads of the serial type as disclosed in FIG. 2 are arranged in a zigzag state or in parallel to form a continuous recording head so as to give the intended length. Alternatively, construction that one recording head integrally formed so as to have a continuous nozzle row is used may also be adopted.

The above-described recording apparatus of the serial type or line type is an embodiment that a head of the construction of 4 ejection opening rows (or nozzle rows) independently or integrally formed and using 4 color inks (Y, M, C and K) is installed. It is also preferable that the number of ejection opening rows is increased to about 5 to 12, and about at least one ink of the 4 color inks, inks of the same color are duplicatively charged in plural ejection opening rows (or nozzle rows). Examples thereof include construction of 8 ejection opening rows (or nozzle rows) and construction of 12 ejection opening rows (or nozzle rows) that 2 or 3 heads of the construction illustrated in FIG. 2 are continuously connected.

According to the ink jet recording apparatus of the present invention, the application of the ink is divided into plural times when an image having a portion where the duty is 80% or more and the total amount of the ink applied is 5.0 μl/cm² or less is formed in a basic matrix for forming the image. The amount of the ink applied at each of the times divided is controlled to 0.7 μl/cm² or less. The ink jet recording apparatus of the present invention has a control mechanism for conducting such divided application of ink. The operation of the ink jet recording head and the timing of conveyance operation of plain paper are controlled by this control mechanism to conduct such divided application of ink.

Figure 3:
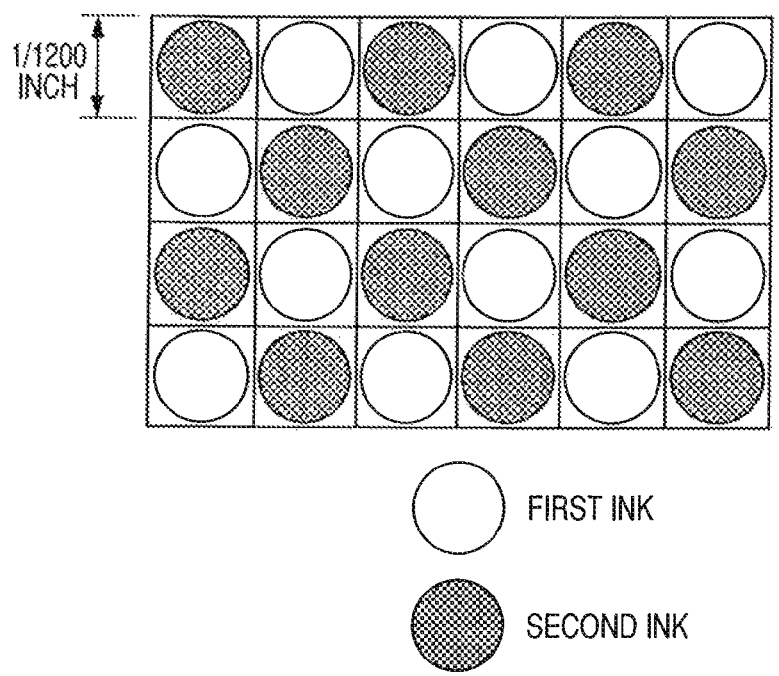
FIG. 3 illustrates an example of a method for forming recording dots.

The number of times of division in the application of the ink may be set according to desired recording conditions. An example where the application of ink is divided into 2 times is illustrated in FIG. 3. This example is an example where the resolution of a basic matrix is 1,200 dpi (width)×1,200 dpi (length), and an image having a portion where the duty is 100% is formed. In FIG. 3, the impact positions of the ink applied at the first time and the impact positions of the ink applied at the second time are illustrated as the first ink and the second ink, respectively. The first ink and second ink are respectively applied in a fixed amount.

EXAMPLES

The present invention will hereinafter be described specifically by the following Examples and Comparative Examples. Incidentally, all designations of "part" or "parts" and "%" in the following examples mean part or parts by mass and % by mass unless expressly noted.

First of all, processes for preparing pigment dispersions contained in inks used in Examples and Comparative Examples are described.
(Preparation of Pigment Dispersion)
<Preparation of Self-Dispersion Pigment Dispersion A>

After carbon black (10 g) having a specific surface area of 320 m²/g and a DBP oil absorption of 110 ml/100 g and aminopropylphosphoric acid (2.8 g) were fully mixed with water (72 g), nitric acid (1.62 g) was added dropwise to the resultant mixture, and the mixture was stirred at 70° C. After several minutes, a solution with sodium nitrite (1.07 g) dissolved in water (5 g) was added, and stirring was conducted for additionally 1 hour. The resultant slurry was filtered through filter paper (trade name: Toyo Filter Paper No. 2; product of Advantec Co.), and the resultant pigment particles were fully washed with water and dried in an oven controlled to 90° C. A black pigment with a group represented by the following chemical formula (I) introduced into the surface of carbon black was prepared by the above-described process.

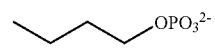

Chemical formula (I)

The amount of the surface functional group of the black pigment prepared above was determined by neutralization titration with sodium hydroxide and then the surface functional group density was obtained from the value to find it to be 620 μmol/g. The 50% cumulative particle size of the black pigment prepared above was measured by Nanotrac UPA 150EX (manufactured by NIKKISO) and found to be 110 nm. After this pigment was adjusted with ion-exchanged water so as to give a pigment concentration of 10%, the pH of the resultant dispersion was adjusted to 7.5 with aqueous ammonia. The dispersion was filtered by using a prefilter and a filter having a pore size of 1 μm in combination to obtain a self-dispersion pigment dispersion A.

<Preparation of Self-Dispersion Pigment Dispersion B>

A self-dispersion pigment dispersion B was obtained in the same manner as in the preparation of the self-dispersion pigment dispersion A except that C.I. Pigment Yellow 74 was used in place of carbon black.

<Preparation of Self-Dispersion Pigment Dispersion C>

A self-dispersion pigment dispersion C was obtained in the same manner as in the preparation of the self-dispersion pigment dispersion A except that C.I. Pigment Red 122 was used in place of carbon black.

<Preparation of Self-Dispersion Pigment Dispersion D>

A self-dispersion pigment dispersion D was obtained in the same manner as in the preparation of the self-dispersion pigment dispersion A except that C.I. Pigment Blue 15:3 was used in place of carbon black.

Examples of preparing inks for Examples of the present invention and Comparative Examples are then described.

Example 1

(Preparation of Ink 1)

After the following components (100 parts in total) were mixed for 2 hours, the resultant mixture was adjusted to pH 8.5 with aqueous ammonia and filtered through a filter having a pore size of 2.5 µm to obtain an ink 1 of Example. The surface tension of the ink was 29 mN/m, and the particle size of the self-dispersion pigment was 115 nm.

Self-dispersion pigment dispersion A: 40 parts
Glycerol (coefficient of hydrophilicity-hydrophobicity: 0.11): 16 parts
1,6-Hexanediol (coefficient of hydrophilicity-hydrophobicity: 0.76): 4 parts
Isopropyl alcohol: 1 part
Ethylene oxide adduct of acetylene glycol (trade name: Olfin E1010, product of Nisshin Chemical Industry Co., Ltd., HLB value: 10 or more): 1 part
Triethylene glycol monobutyl ether: 0.5 parts
Water: balance.

Example 2

(Preparation of Ink 2)

After the following components (100 parts in total) were mixed for 2 hours, the resultant mixture was adjusted to pH 8.5 with aqueous ammonia and filtered through a filter having a pore size of 2.5 µm to obtain an ink 2 of Example. The surface tension of the ink was 29 mN/m, and the particle size of the self-dispersion pigment was 120 nm.

Self-dispersion pigment dispersion A: 40 parts
Glycerol (coefficient of hydrophilicity-hydrophobicity: 0.11): 8 parts
Trimethylolpropane (coefficient of hydrophilicity-hydrophobicity: 0.31): 8 parts
1,2-Hexanediol (coefficient of hydrophilicity-hydrophobicity: 0.97): 4 parts
Isopropyl alcohol: 1 part
Ethylene oxide adduct of acetylene glycol (trade name: Olfin E1010, product of Nisshin Chemical Industry Co., Ltd., HLB value: 10 or more): 1 part
Triethylene glycol monobutyl ether: 0.5 parts
Water: balance.

Comparative Example 1

(Preparation of ink 3)

An ink 3 of Comparative Example was obtained in the same manner as in the preparation of the ink 1 except that the content of the ethylene oxide adduct of acetylene glycol was changed from 1 part to 0.1 part. The surface tension of the ink was 36 mN/m, and the particle size of the self-dispersion pigment was 110 nm.

Comparative Example 2

(Preparation of ink 4)

An ink 4 of Comparative Example was obtained in the same manner as in the preparation of the ink 1 except that glycerol was changed to 1,2-pentanediol (coefficient of hydrophilicity-hydrophobicity: 0.93). The surface tension of the ink was 28 mN/m, and the particle size of the self-dispersion pigment was 120 nm.

Comparative Example 3

(Preparation of Ink 5)

An ink 5 of Comparative Example was obtained in the same manner as in the preparation of the ink 1 except that 1,6-hexanediol was changed to triethylene glycol (coefficient of hydrophilicity-hydrophobicity: 0.07). The surface tension of the ink was 30 mN/m, and the particle size of the self-dispersion pigment was 110 nm.

Example 3

(Preparation of Ink 6)

An ink 6 of Example was obtained in the same manner as in the preparation of the ink 1 except that the self-dispersion pigment dispersion B was used in place of the self-dispersion pigment dispersion A. The surface tension of the ink was 29 mN/m, and the particle size of the self-dispersion pigment was 130 nm.

Example 4

(Preparation of Ink 7)

An ink 7 of Example was obtained in the same manner as in the preparation of the ink 1 except that the self-dispersion pigment dispersion C was used in place of the self-dispersion pigment dispersion A. The surface tension of the ink was 29 mN/m, and the particle size of the self-dispersion pigment was 90 nm.

Example 5

(Preparation of Ink 8)

An ink 8 of Example was obtained in the same manner as in the preparation of the ink 1 except that the self-dispersion pigment dispersion D was used in place of the self-dispersion pigment dispersion A. The surface tension of the ink was 29 mN/m, and the particle size of the self-dispersion pigment was 110 nm.

The inks 1 and 2 of Examples 1 and 2, and the inks 3 to 5 of Comparative Examples were used to evaluate recorded articles under the following conditions, thereby providing examples (Examples 1 and 2, and Comparative Examples 1 to 3) of image forming methods and recording apparatus for the present invention and comparison.

(Evaluation Conditions)

Recording medium: Office Planner paper for common use in PPC/BJ (plain paper; product of Canon Marketing Japan Inc.)
Printer A: F930 (manufactured by Canon Inc.; recording head: 6 ejection opening rows, including 512 nozzles in each row; amount of the ink: 4.0 pl (fixed amount); resolution of the basic matrix: 2,400 dpi (width)×2,400 dpi (length))

Image forming method: Each of the inks 1 to 5 was charged in a black ink head part of the printer to print a solid print image. Upon the formation of the solid print image, the application of each ink was divided into 4 times, the amount of the ink applied at one time was an equal amount of 0.3 µl/cm², and the total amount of the ink applied was 1.2 µl/cm².

Recorded articles in Examples 1 and 2, and Comparative Examples 1 to 3 were evaluated as to image density (O.D.), fixability, small character printing and uniformity, and the results are shown in Table 2. Evaluation as to images was made by using a black head and printing a solid print image (3 cm×3 cm) and JIS first level Chinese characters of 5 point. Incidentally, evaluating methods and standards of the recording are as follows.

(Image Density)

O.D. of a solid print image was measured by a densitometer (Macbeth RD915; manufactured by Macbeth Co.).
A: O.D. was 1.40 or more;
B: O.D. was 1.35 or more, but less than 1.40;
C: O.D. was 1.30 or more, but less than 1.35;
D: O.D. was less than 1.30.

(Fixability)

After 10 seconds from the printing of the solid print image, silbon paper was put under pressure on the print to visually evaluate the degree of transfer according to the following evaluation standard.
A: No transfer is observed;
B: Transfer is slightly observed;
C: Transfer is clearly observed.

(Small Character Printing)

The sharpness of small characters (Chinese characters) printed was visually evaluated according to the following evaluation standard.
A: Even complex characters can be expressed;
B: Outlines are slightly disordered in complex characters, but it is within an allowable range;
C: Complex characters cannot be sufficiently expressed;
D: Disorder may be observed even in simple characters in some cases.

(Uniformity)

The degree of occurrence of blank area in the solid print image was visually evaluated according to the following evaluation standard.
A: No blank area is observed;
B: Blank area is slightly observed;
C: Blank area is clearly observed.

TABLE 2

| | Ink | Image density | Fixability | Small character printing | Uniformity |
|---|---|---|---|---|---|
| Ex. 1 | 1 | A | A | A | A |
| Ex. 2 | 2 | A | A | A | A |
| Comp. Ex. 1 | 3 | C | C | A | C |
| Comp. Ex. 2 | 4 | C | A | A | A |
| Comp. Ex. 3 | 5 | A | A | C | C |

When the results of Examples 1 and 2 are compared with those of Comparative Example 1, it is understood that in the inks according to the present invention, the surface tension of each ink is controlled to 34 mN/m or less, whereby image density is made high, and fixability and uniformity are improved. When the results of Examples 1 and 2 are compared with those of Comparative Example 2, it is understood that the inks according to the present invention contain the water-soluble substance having a coefficient of hydrophilicity-hydrophobicity of 0.25 or less, whereby image density is made high. When the results of Examples 1 and 2 are compared with those of Comparative Example 3, it is understood that the inks according to the present invention contain the water-soluble substance having a coefficient of hydrophilicity-hydrophobicity of 0.37 or more, whereby small character printing can be well conducted, and uniformity is improved.

The respective inks of Examples 1 and 2 were used to provide examples of image forming methods and recording apparatus for performing such methods in Examples 6 to 15 under their corresponding combined conditions shown in Tables 3 and 4. Table 3 shows examples where the amount of the ink applied was divided into equal amounts at respective times. Table 4 shows examples where the amounts of the ink applied at the respective times are not equal. The evaluation items and methods are the same as in Examples 1 and 2. The results are shown in Table 5.

A printer B for evaluation added is F950 (manufactured by Canon Inc.; 6 heads, including 512 nozzles in each head; amount of ink droplet: 2 pl; resolution of the basic matrix: 2,400 dpi×1,200 dpi).

TABLE 3

| | Ink | Printer | Divided times | Amount applied at each time (µl/cm²) | Total amount applied (µl/cm²) |
|---|---|---|---|---|---|
| Ex. 6 | 2 | A | 2 | 0.5 | 1.0 |
| Ex. 7 | 2 | A | 3 | 0.333 | 1.0 |
| Ex. 8 | 2 | A | 5 | 0.2 | 1.0 |
| Ex. 9 | 2 | A | 8 | 0.125 | 1.0 |
| Ex. 10 | 1 | A | 5 | 0.2 | 1.0 |
| Ex. 11 | 2 | A | 8 | 0.375 | 3.0 |
| Ex. 12 | 2 | A | 8 | 0.4 | 3.2 |

TABLE 4

| | Ink | Printer | Divided times | Amount applied at each time (µl/cm²) | | | | Total amount applied (µl/cm²) |
|---|---|---|---|---|---|---|---|---|
| | | | | 1st | 2nd | 3rd | 4th | |
| Ex. 13 | 2 | B | 4 | 0.3 | 0.3 | 0.3 | 0.3 | 1.2 |
| Ex. 14 | 2 | B | 4 | 0.2 | 0.1 | 0.1 | 0.7 | 1.2 |
| Ex. 15 | 2 | B | 4 | 0.5 | 0.1 | 0.1 | 0.5 | 1.2 |

TABLE 5

| | Image density | Fixability | Small character printing | Uniformity |
|---|---|---|---|---|
| Ex. 6 | B | A | B | A |
| Ex. 7 | A | A | A | A |
| Ex. 8 | A | A | A | A |
| Ex. 9 | A | A | A | A |
| Ex. 10 | A | A | A | A |
| Ex. 11 | A | A | A | A |
| Ex. 12 | A | A | B | A |
| Ex. 13 | A | A | A | A |
| Ex. 14 | B | A | A | A |
| Ex. 15 | A | A | A | A |

The respective inks of Examples 1 to 5 and Comparative Examples 1 to 3, and Printer B were used to provide examples of image forming methods and recording apparatus for performing such methods in Examples 16 and 17 and Comparative Examples 4 to 6 according to their corresponding combinations of 4 color inks and the same conditions shown in Table 6.

In the evaluation of recorded images, Office Planner paper for common use in PPC/BJ (plain paper; product of Canon Marketing Japan Inc.) was used as a recording medium.

TABLE 6

| | Ink charged in head | | | | Printer | Divided times | Amount applied at each time ($\mu$l/cm$^2$) | Total amount applied ($\mu$l/cm$^2$) |
|---|---|---|---|---|---|---|---|---|
| | K | Y | M | C | | | | |
| Ex. 16 | 1 | 6 | 7 | 8 | B | 4 | 0.25 | 1.0 |
| Ex. 17 | 2 | 6 | 7 | 8 | B | 4 | 0.25 | 1.0 |
| Comp. Ex. 4 | 3 | 6 | 7 | 8 | B | 4 | 0.25 | 1.0 |
| Comp. Ex. 5 | 4 | 6 | 7 | 8 | B | 4 | 0.25 | 1.0 |
| Comp. Ex. 6 | 5 | 6 | 7 | 8 | B | 4 | 0.25 | 1.0 |

The recorded images of Examples 16 and 17, and Comparative Examples 4 to 6 were evaluated as to bleeding and resistance to clogging. The results are shown in Table 7. With respect to the bleeding, solid print images were printed with all the 6 combinations of the 4 inks charged under the same conditions in such a manner that the respective colors adjoin each other, and the condition of the boundary portions thereof was visually observed. With respect to the resistance to clogging, the apparatus was left to stand for 1 month at ordinary temperature in a capped state after the investigation under the respective conditions to observe printing condition after recovery operation. Incidentally, evaluating methods and standards of the recording are as follows.

(Bleeding)
A: Bleeding is not observed;
B: Bleeding is slightly observed, but it is within an allowable range;
C: Bleeding is observed;
D: Bleeding is markedly observed.

(Resistance to Clogging)
Evaluation was made by printing a nozzle check pattern after recovery operation.
A: Normal printing can be conducted when the cleaning operation (in which an ink is sucked at ejection openings of a recording head) is performed one time;
B: Normal printing cannot be conducted when the cleaning operation is performed one time, but normal printing can be conducted when the cleaning operation is performed three times;
C: Normal printing cannot be conducted even when the cleaning operation is performed three times, but normal printing can be conducted when strong cleaning operation (in which an ink is more strongly sucked at ejection openings of a recording head than the cleaning operation) is performed three times;
D: Neither stable ejection nor normal printing can be conducted even when the strong cleaning operation is performed repeatedly.

TABLE 7

| | Bleeding | Resistance to clogging |
|---|---|---|
| Example 16 | A | B |
| Example 17 | A | A |
| Comp. Example 4 | C | A |
| Comp. Example 5 | A | D |
| Comp. Example 6 | D | A |

When Examples 16 and 17 are compared with Comparative Example 4, it is understood that the surface tension of the ink is controlled to 34 mN/m or less, whereby bleeding is well inhibited. When Examples 16 and 17 are compared with Comparative Examples 5 and 6, it is understood that the water-soluble compound having a coefficient of hydrophilicity-hydrophobicity of 0.37 or more and the water-soluble compound having a coefficient of hydrophilicity-hydrophobicity of 0.25 or less are used in combination in the ink, whereby bleeding and clogging are well inhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-191038, filed Jul. 23, 2007, and Japanese Patent Application No. 2008-036153, filed Feb. 18, 2008 which are hereby incorporated by reference herein in their entirety.

The invention claimed is:

1. An ink jet recording ink comprising (a) a self-dispersion pigment, to the surface of which an anionic functional group represented by the following general formula (I) has been bonded directly or through another atomic group, (b) water, (c) a water-soluble substance having a coefficient of hydrophilicity-hydrophobicity of 0.37 or more as defined by the following equation (A), (d) a water-soluble substance having a coefficient of hydrophilicity-hydrophobicity of 0.25 or less as defined by the equation (A), and (e) an ethylene oxide adduct of acetylene glycol having a HLB value of 10 or more, the ink-jet recording ink having a surface tension of 34 mN/m or less, wherein the water-soluble substance having a coefficient of hydrophilicity-hydrophobicity of 0.37 or more is a water-soluble compound (1) having a glycol structure of a hydrocarbon having 4 to 7 carbon atoms, wherein the water-soluble substance having a coefficient of hydrophilicity-hydrophobicity of 0.25 or less is a water-soluble compound (2), such that the proportion (1)/(2) of the content of the water-soluble compound (1) to the content of the water-soluble compound (2) in the ink is 1/5 or more and 5/1 or less, and the ethylene oxide adduct of acetylene glycol is contained in the ink in an amount of 0.2% by mass or more and 5% by mass or less:

General formula (I)

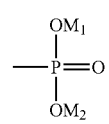

wherein $M_1$ and $M_2$ are, independently of each other, a hydrogen atom, alkali metal, ammonium, or organic ammonium;

Coefficient of hydrophilicity-hydrophobicity=[(Water activity value of a 20% aqueous solution)−(Molar fraction of water in the 20% aqueous solution)]/[1−(Molar fraction of water in the 20% aqueous solution)]                Equation (A).

2. The ink jet recording ink according to claim 1, which further comprises a water-soluble substance having a coefficient of hydrophilicity-hydrophobicity of 0.26 or more, but less than 0.37 as defined by the equation (A).

3. The ink jet recording ink according to claim 1, wherein the particle size of the self-dispersion pigment is from 60 nm or more to 145 nm or less.

4. An ink jet image-forming method for forming an image by applying the ink jet recording ink according to claim 1 in a fixed amount of from 0.5 pl or more to 6.0 pl or less to plain paper,
wherein when an image having a portion where the ink is applied in a duty of 80% or more and in an amount of 5.0 µl/cm² or less in total is formed in a basic matrix for forming the image, the ink is divided and applied in plural stages, with the amount of the ink applied at each stage being 0.7 µl/cm² or less.

5. The ink jet image-forming method according to claim 4, wherein the resolution of the basic matrix is from 600 dpi or more to 4,800 dpi or less.

6. The ink jet image-forming method according to claim 4, wherein the number of stages is from 2 to 8.

7. The ink jet image-forming method according to claim 4, wherein the application of the ink is conducted by the action of thermal energy.

8. An ink jet recording apparatus equipped with a recording head for forming an image by applying the ink jet recording ink according to claim 1 in a fixed amount of from 0.5 pl or more to 6.0 pl or less to plain paper,
wherein the apparatus comprises a control mechanism, such that when an image having a portion where the ink is applied in a duty of 80% or more and in an amount of 5.0 ml/cm² or less in total is formed in a basic matrix for forming the image, the ink is divided and applied in plural stages, with the amount of the ink applied at each stage being controlled to 0.7 µl/cm² or less.

9. The ink jet recording apparatus according to claim 8, wherein the recording head is a recording head that the application of the ink(s) is conducted by the action of thermal energy.

10. The ink jet recording ink according to claim 1, wherein a proportion of the content of the water-soluble compound (1) to the content of the water-soluble compound (2) in the ink is 1/20 or more.

11. The ink jet recording ink according to claim 10, wherein the proportion of the content of the water-soluble compound (1) to the content of the water-soluble compound (2) in the ink is 20/1 or less.

12. An ink jet image-forming method for forming an image by applying each of at least 4 color inks of black, cyan, magenta, and yellow in a fixed amount of from 0.5 pl or more to 6.0 pl or less for each ink to plain paper, wherein:
each of the 4 color inks (i) comprise (a) a self-dispersion pigment, to the surface of which an anionic functional group represented by the following general formula (I) has been bonded directly or through another atomic group, (b) water, (c) a water-soluble substance having a coefficient of hydrophilicity-hydrophobicity of 0.37 or more as defined by the following equation (A), (d) a water-soluble substance having a coefficient of hydrophilicity-hydrophobicity of 0.25 or less as defined by the equation (A), and (e) an ethylene oxide adduct of acetylene glycol having a HLB value of 10 or more, and (ii) has a surface tension of 34 mN/m or less, wherein the water-soluble substance having a coefficient of hydrophilicity-hydrophobicity of 0.37 or more is a water-soluble compound (1) having a glycol structure of a hydrocarbon having 4 to 7 carbon atoms, wherein the water-soluble substance having a coefficient of hydrophilicity-hydrophobicity of 25 or less is a water-soluble compound (2), such that the proportion (1)/(2) of the content of the water-soluble compound (1) to the content of the water-soluble compound (2) in the ink is 1/5 or more and 5/1 or less, and the ethylene oxide adduct of acetylene glycol is contained in the ink in an amount of 0.2% by mass or more and 5% by mass or less, and
wherein when an image having a portion where the inks are applied in a duty of 80% or more and in an amount of 5.0 µl/cm² or less in total is formed in a basic matrix for forming the image, the inks are divided and applied in plural stages, with the amount of the inks applied at each stage being 0.7 µl/cm² or less:

General formula (I)

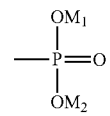

wherein $M_1$ and $M_2$ are, independently of each other, a hydrogen atom, alkali metal, ammonium, or organic ammonium;

Coefficient of hydrophilicity-hydrophobicity=[(Water activity value of a 20% aqueous solution)−(Molar fraction of water in the 20% aqueous solution)]/[1−(Molar fraction of water in the 20% aqueous solution)]   Equation (A).

13. An ink jet recording apparatus equipped with a recording head for forming an image by applying each of at least 4 color inks of black, cyan, magenta, and yellow in a fixed amount of from 0.5 pl or more to 6.0 pl or less for each ink to plain paper, wherein:
the apparatus comprises a control mechanism, such that when an image having a portion where the inks are applied in a duty of 80% or more and in an amount of 5.0 pl/cm² or less in total is formed in a basic matrix for forming the image, the inks is divided and applied in plural stages, with the amount of the inks applied at each stage being controlled to 0.7 µl/cm² or less, and
each of the inks (i) comprises (a) a self-dispersion pigment, to the surface of which an anionic functional group represented by the following general formula (I) has been bonded directly or through another atomic group, (b) water, (c) a water-soluble substance having a coefficient of hydrophilicity-hydrophobicity of 0.37 or more as defined by the following equation (A), (d) a water-soluble substance having a coefficient of hydrophilicity-hydrophobicity of 0.25 or less as defined by the equation (A), and (e) an ethylene oxide adduct of acetylene glycol having a HLB value of 10 or more, and (ii) has a surface tension of 34 mN/m or less, wherein the water-soluble substance having a coefficient of hydrophilicity-hydrophobicity of 0.37 or more is a water-soluble compound (1) having a glycol structure of a hydrocarbon having 4 to 7 carbon atoms, wherein the water-soluble substance having a coefficient of hydrophilicity-hydrophobicity of 25 or less is a water-soluble compound (2), such that the proportion (1)/(2) of the content of the water-soluble compound (1) to the content of the water-soluble compound (2) in the ink is 1/5 or more and 5/1 or less, and the ethylene oxide adduct of acetylene glycol is contained in the ink in an amount of 0.2% by mass or more and 5% by mass or less:

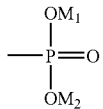
General formula (I)

wherein $M_1$ and $M_2$ are, independently of each other, a hydrogen atom, alkali metal, ammonium, or organic ammonium;

Coefficient of hydrophilicity-hydrophobicity=[(Water activity value of a 20% aqueous solution)−(Molar fraction of water in the 20% aqueous solution)]/[1−(Molar fraction of water in the 20% aqueous solution)]     Equation (A).

* * * * *